UNITED STATES PATENT OFFICE.

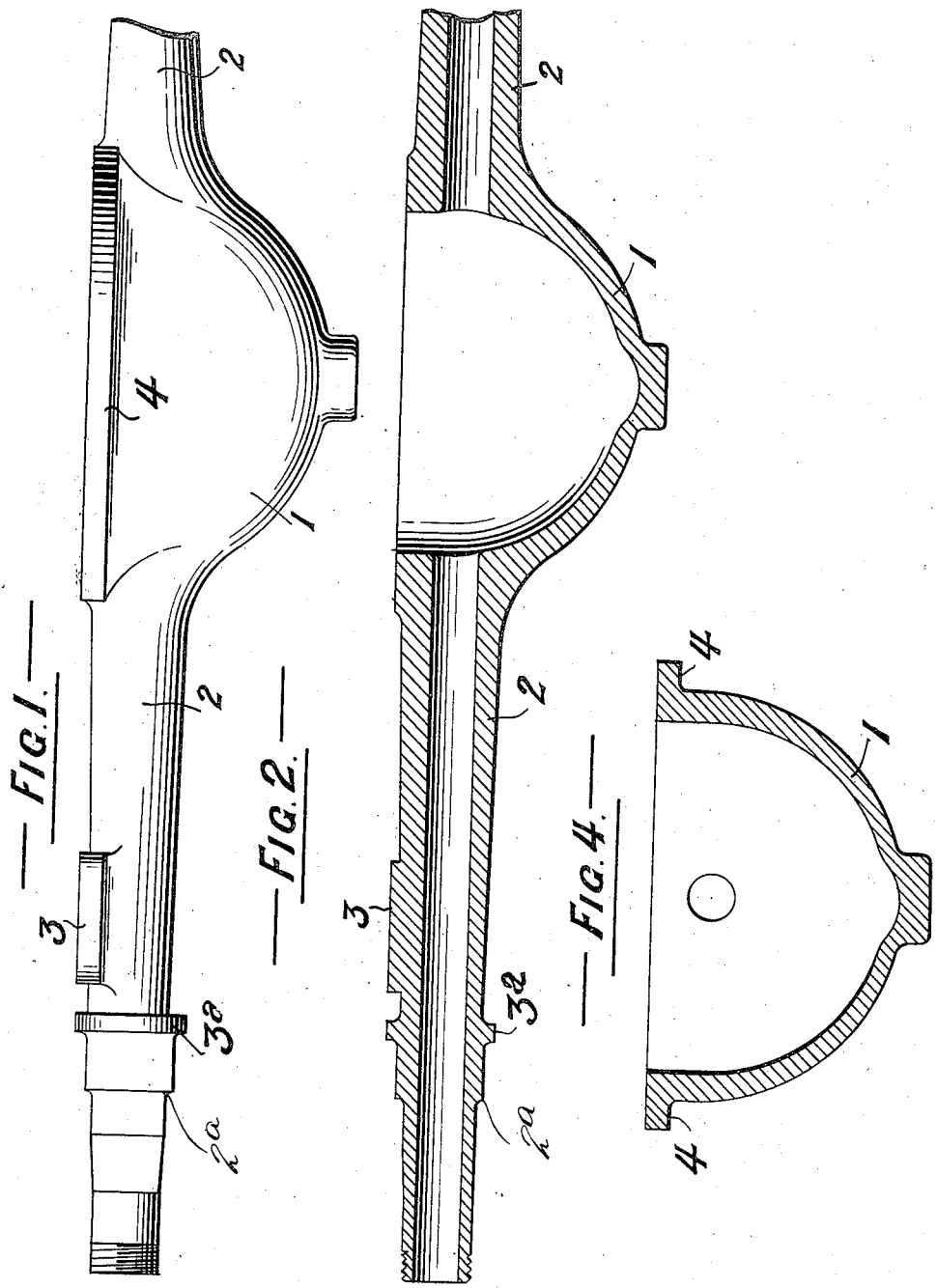

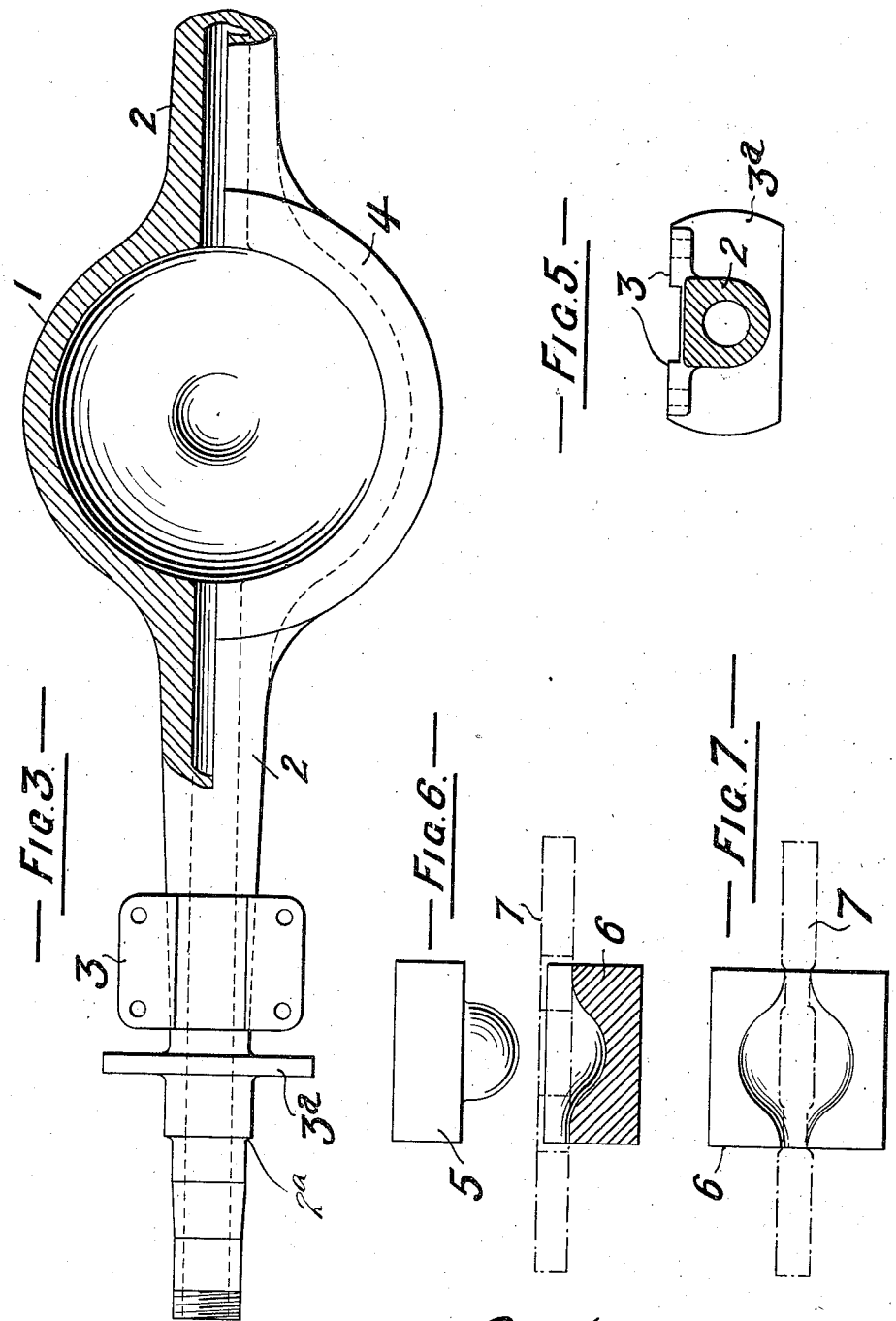

CHARLES WILLIAM DAVIS, OF KIRKSTALL FORGE, NEAR LEEDS, ENGLAND, ASSIGNOR OF THREE-FOURTHS TO HUGH MYDDLETON BUTLER, OF KIRKSTALL FORGE, NEAR LEEDS, ENGLAND.

PROCESS FOR MAKING AXLES FOR MOTOR-DRIVEN ROAD VEHICLES.

1,426,279.  Specification of Letters Patent.  Patented Aug. 15, 1922.

Application filed November 21, 1918. Serial No. 263,572.

*To all whom it may concern:*

Be it known that I, CHARLES WILLIAM DAVIS, a subject of the King of Great Britain, residing at Kirkstall Forge, near Leeds, in the county of York, England, have invented certain new and useful Improvements in Processes for Making Axles for Motor-Driven Road Vehicles, of which the following is a specification.

Rear axles for motor-driven road vehicles, known as the banjo type of rear axle, have been constructed each comprising a substantially annular frame, from which extend two tubular wheel-carrying members, which latter carry the road wheel bearings while the two parts of the live axle pass through the tubular wheel-carrying members, and the gearing connecting the live axles is located in the space within the annular frame, and such axles have been made as solid or homogeneous stampings.

In considering this manufacture it is essential to point out that in such banjo axles made as solid or homogeneous stampings having a central space surrounded by an annular frame forming a portion of the axle, it has been considered necessary to make the frame surrounding the space of a solid section, with the result that the axle is comparatively heavy and great difficulty is experienced in disposing of the material in which the space is formed. Considerable expense is involved in this manufacture in that the metal has to be prepared for stamping by being spread out to entirely cover the ring impression in the die, and then very considerable power is required to stamp down the middle diaphragm inside the ring, and afterwards this diaphragm has to be punched out; a one piece axle has been produced with the central part in the form of a solid disc, which disc has been cut out by a trepanning machine to leave the open ring, and in this respect the manufacture has presented difficulties.

Now according to the present invention an axle of the type stated is produced by stamping, forging or pressing the entire axle comprising an open-topped central chamber or box with its laterally extending wheel-carrying members wholly from one piece of metal, the said members being afterwards axially bored to permit of the passage of the parts of the live axle therethrough, which parts of the live axle are connected to gearing which is located in the central chamber or box of the said axle. In carrying out this invention the box-like structure preferably takes the form of a hemispherical or approximately hemispherical basin, and webs may extend between the lateral members and the exterior of the basin, and such a basin may have a flange or the like around its edge to facilitate the fixing thereto of a cover.

The present invention overcomes the known difficulties in the production of an axle of this kind produced by stamping, forging or pressing in one piece, or as before explained with the central portion in one piece, by placing the billet of metal, from which the axle is to be produced, across a die suitably formed to produce the basin, and then according to this invention the metal is stamped, pressed or forged so that what has hitherto been surplus metal in the centre of the structure, which has had to be afterwards removed is formed into the wall of the basin. With such a structure so produced the upper edge of the basin can be formed simultaneously with the stamping of the structure with an external surrounding flange or thickness onto which a cover can be secured. Thus a great saving of material is effected by this invention, the material is disposed of without any difficulty by utilizing it to form the basin, and the structure being formed in one piece not only is the manufacture of this form of axle facilitated and simplified but the strength of the structure is increased.

The gearing which is carried by such axles is then located in the interior of the basin or inverted dome, and a dome cover is then constructed which is bolted to the flanges aforesaid, and such a dome cover carries bearings for the worm shaft or crown wheel shaft, etc.

The invention will be further exemplified by the following description referring to the accompanying drawings in which two examples of construction are shown.

Fig. 1 is an elevation (one end being broken away), Fig. 2 is a vertical section, Fig. 3 is a sectional plan view, and Fig. 4 is a transverse central vertical section, showing an axle according to this invention produced by stamping in one homogeneous piece of metal, and Fig. 5 is a transverse vertical section of the axle shown at Fig. 1 taken through the spring seating.

Figs. 6 and 7 are diagrams in sectional elevation and plan to explain the process of manufacture.

Referring to Figs. 1 to 5, the axle consists of an approximately hemispherical basin 1 formed with diametrically oppositely extending lateral members 2 each of which in the instance shown is formed with a wheel bearing $2^a$, a spring seating 3 and flange $3^a$ entirely by stamping in one piece, and the basin 1 is also formed with flanges 4 extending partly around the same, one in the front and the other in the rear, the flanges affording a convenience for the fixture thereto of a dome-shaped or other suitable cover (not shown). The members 2 are then bored to receive the two parts of the live axle, while the said members themselves carry the wheel bearings.

Such an axle may be produced by stamping between the dies such as 5, 6, Figs. 6 and 7, the bar 7 indicated by dotted lines from which the axle is produced being laid across the lower die 6 and then acted upon by the upper die 5, so as to cause the metal to flow into and assume the form of the die 6, thereby producing the basin as described homogeneous with the two lateral members 2.

What I claim as my invention and desire to secure by Letters Patent is:—

1. That process of making an axle housing which consists in drop-forging a suitable billet of metal by pressing the central part of said billet between suitable dies to force same into a dish part leaving the ends of the billet extending laterally therefrom.

2. That process of making an axle housing which consists in drop-forging a suitable billet of metal by pressing the central part of said billet between suitable dies to force same into a semi-spherical dish member, leaving the ends of the billet extending laterally therefrom, aligning and shaping said ends and boring the same longitudinally throughout their length.

In witness whereof I have hereunto set my hand in the presence of two witnesses.

CHARLES WILLIAM DAVIS.

Witnesses:
 ROBERT ARMSTRONG,
 THOMAS SMITH WHITAKER.